(12) United States Patent
Lee

(10) Patent No.: US 11,722,986 B2
(45) Date of Patent: Aug. 8, 2023

(54) POSITIONING SYSTEM FOR CONTINUOUSLY AND ACCURATELY UPDATING POSITION VALUE OF WIRELESS LAN AP, AND METHOD THEREFOR

(71) Applicant: FUREUN CO., LTD., Seoul (KR)

(72) Inventor: Sang Seo Lee, Uiwang-Si (KR)

(73) Assignee: FUREUN CO., LTD., Seoul (KR)

( * ) Notice: Subject to any disclaimer, the term of this patent is extended or adjusted under 35 U.S.C. 154(b) by 97 days.

(21) Appl. No.: 17/055,661

(22) PCT Filed: May 24, 2019

(86) PCT No.: PCT/KR2019/006287
§ 371 (c)(1),
(2) Date: Nov. 16, 2020

(87) PCT Pub. No.: WO2019/231184
PCT Pub. Date: Dec. 5, 2019

(65) Prior Publication Data
US 2021/0243718 A1    Aug. 5, 2021

(30) Foreign Application Priority Data
May 31, 2018    (KR) .................. 10-2018-0062579

(51) Int. Cl.
*H04W 64/00*    (2009.01)
*H04B 17/318*    (2015.01)
(Continued)

(52) U.S. Cl.
CPC ........ *H04W 64/003* (2013.01); *H04B 17/318* (2015.01); *H04W 84/12* (2013.01); *H04W 88/08* (2013.01)

(58) Field of Classification Search
CPC ... H04W 64/003; H04W 84/12; H04B 17/318
See application file for complete search history.

(56) References Cited

U.S. PATENT DOCUMENTS

2020/0200857 A1* 6/2020 Wirola ................ H04W 12/128

FOREIGN PATENT DOCUMENTS

KR    10-2010-0120924 A    11/2010
KR    10-1019954 B1    3/2011
(Continued)

*Primary Examiner* — Muthuswamy G Manoharan
(74) *Attorney, Agent, or Firm* — KORUS Patent, LLC; Seong Il Jeong

(57) ABSTRACT

The present invention is configured to compare a signal strength based on a position value of a wireless LAN AP recorded in a wireless LAN AP position database (120) with a signal strength based on the wireless LAN AP information of nearby wireless LAN APs and a detected position value obtained through actual search performed by position detection devices (88 and 84). When the signal strength based on the wireless LAN AP information of the nearby wireless LAN APs and the detected position value obtained through actual search performed by the position detection devices (88 and 84) is higher, it means that the detected position value is closer to a corresponding wireless LAN. Accordingly, the position value of the corresponding wireless LAN AP in the wireless LAN AP position database (120) and the signal strength are updated by being replaced with the value obtained through the actual search.

12 Claims, 7 Drawing Sheets

(51) Int. Cl.
    *H04W 84/12*     (2009.01)
    *H04W 88/08*     (2009.01)

(56) References Cited

FOREIGN PATENT DOCUMENTS

| KR | 10-2012-0003572 A | | 1/2012 |
| KR | 10-2012-0058946 A | | 6/2012 |
| KR | 20130037147 | * | 4/2013 |
| KR | 10-2013-0094947 A | | 8/2013 |
| KR | 10-2016-0076552 A | | 7/2016 |
| KR | 20170084637 | * | 7/2017 |

* cited by examiner (a)

(b)

11

| Mac Address | RF | Position |
|---|---|---|
| a0 | -75 | Gd |
| a1 | -87 | Gd |
| a3 | -95 | Gd |
| a5 | -120 | Gd |

120

| Mac Address | RF | Position |
|---|---|---|
| a1 | -95 | G1 |
| a2 | -89 | G2 |
| a3 | -84 | G3 |
| a4 | -110 | G4 |
| a5 | -130 | G5 |
| . | . | . |
| . | . | . |
| . | . | . |

(a)

| Mac Address | RF |
|---|---|
| a1 | -87 > -95 |
| a3 | -95 < -84 |
| a5 | -120 > -130 |

(b)

120

| Mac Address | RF | Position |  |
|---|---|---|---|
| a0 | -75 | Gd | 403 |
| a1 | -87 | Gd |  |
| a2 | -89 | G2 |  |
| a3 | -84 | G3 | 401 |
| a4 | -110 | G4 |  |
| a5 | -120 | Gd |  |
| . | . | . |  |
| . | . | . |  |
| . | . | . |  |

| SSID | Mac Address | RF strength |

| Mac Address | RF |
|---|---|
| a0 | -78 |
| a1 | -85 |
| a2 | -97 |
| a3 | -110 |
| a4 | -130 |

11'

| Mac Address | RF | Position |
|---|---|---|
| a2 | -103 | G2 |
| a3 | -100 | G3 |
| a4 | -140 | G4 |
| a5 | -150 | G5 |
| . | . | . |
| . | . | . |
| . | . | . |

120

(b)

| Mac Address | RF |
|---|---|
| a2 | -97 > -103 |
| a3 | -110 < -100 |
| a4 | -130 > -140 |

(c)

Calculate and determine the position of a wireless LAN AP detection device by triangulating the position values G2, G3, and G4 of a2, a3, and a4 → Gm (d)

| Mac Address | RF | Position |
|---|---|---|
| a0 | -78 | Gm |
| a1 | -85 | Gm |
| a2 | -97 | Gm |
| a3 | -100 | G3 |
| a4 | -130 | Gm |
| a5 | -150 | G5 |

120, 703, 701

(e)

Position value   Gm

FIG. 7

POSITIONING SYSTEM FOR CONTINUOUSLY AND ACCURATELY UPDATING POSITION VALUE OF WIRELESS LAN AP, AND METHOD THEREFOR

TECHNICAL FIELD

The present invention relates generally to a positioning system and method for continuously updating the position values of wireless LAN Access Points (APs) to accurate values, and more particularly to a positioning system and method in which, as the positions of wireless LAN APs are searched for or positioning is performed, the position values of wireless LAN APs are continuously updated to accurate values.

BACKGROUND ART

As a representative method of positioning terminals such as PCs, notebooks, smartphones, and smartwatches each having a built-in Wi-Fi function, there is a positioning method based on Wi-Fi fingerprints.

This method is configured to detect signals received from wireless LAN APs scattered in the real world for each reference position, to construct a radio map that records signal strengths from individual wireless LAN APs for each reference position, to search for a reference position, having a pattern similar to the signal pattern of wireless LAN APs measured at a terminal, in the radio map, and to determine this reference position to be the position of the terminal.

For example, Korean Patent Application Publication No. 10-2015-0089633 discloses a Wi-Fi fingerprint-based indoor positioning apparatus and method.

This Wi-Fi fingerprint-based positioning method was originally developed for indoor positioning, but it can be sufficiently utilized for outdoor positioning when the number of scattered wireless LAN APs is sufficient. Currently, in Korea, a radio map is constructed based on outdoor positions and is then used.

In other words, a person or vehicle mounted with a collection device configured to collect wireless LAN AP information together with the detection position thereof collects information about wireless LAN APs scattered throughout areas while moving along roads and constructs a radio map, and positioning is performed using the radio map constructed based on positions along the roads in the above manner. For example, the wireless LAN signal collection device based on a high-speed mobile vehicle disclosed in Korean Patent No. 10-1583981 shows a collection device that collects wireless LAN AP information together with a detection position.

However, there are many cases where wireless LAN APs frequently change their existing positions, disappear, or are newly created, and thus the radio map needs to be continuously updated at short periods.

Meanwhile, according to the Wi-Fi fingerprint-based positioning method, the signal strengths of nearby wireless LAN APs are stored for each reference position, and there are a numerous number of reference positions. Accordingly, a positioning server needs a very large storage capacity, the processing speed and response speed thereof are also slow, and the positioning accuracy thereof remains at the accuracy of the initially constructed radio map. Furthermore, when updating is not performed in time, the positioning accuracy will decrease over time.

As described above, according to the Wi-Fi fingerprint-based positioning method, problems arise in that it takes a lot of time and cost to construct the radio map, even the radio map constructed in this way requires continuous updating at short periods, a large storage capacity is required, and the processing speed and response speed thereof are slow.

In order to solve these problems, a change in the way of thinking is required. Basically, the present invention provides a positioning system and method that are based on wireless LAN APs present finitely in the real world other than a numerous number of reference positions and allow the position values of the wireless LAN APs to be continuously updated to correct values as the positions of the wireless LAN APs are searched for or as terminals position themselves.

According to the present invention, the position values of wireless LAN APs can be accurately determined. Accordingly, accurate positioning is enabled by performing positioning based on the position values of the wireless LAN APs.

DISCLOSURE

Technical Problem

An object of the present invention is to provide a positioning system and method in which the database of a positioning server is constructed based on wireless LAN APs present finitely in the real world other than a numerous number of reference positions and, as the positions of the wireless LAN APs are searched for or as terminals position themselves, the position values of the wireless LAN APs are continuously updated to correct values.

Another object of the present invention is to provide a wireless LAN AP position value positioning system and method that allow the position values of wireless LAN APs to be determined to be accurate values, so that, when positioning is performed based on the position values of these wireless LAN APs, accurate positioning is achieved.

Technical Solution

The present invention provides a wireless LAN AP position value positioning method for continuously updating a position value of a wireless LAN AP to an accurate value, the wireless LAN AP position value positioning method including: a wireless LAN AP information and position transmission step at which a wireless LAN AP information and position detection device for a nearby wireless LAN AP detects wireless LAN AP information, including identification information of a wireless LAN AP and signal strength information, and a detection position, which is a position at which the wireless LAN AP information is detected, from each of nearby wireless LAN APs, and transmits the detected wireless LAN AP information and detection position information to a positioning server having a wireless LAN AP position database configured to record a position value of the wireless LAN AP and a signal strength of the wireless LAN AP at the position value in accordance with the identification information of the wireless LAN AP; a common wireless LAN AP checking step at which the positioning server checks for common wireless LAN APs by comparing the identification information of the wireless LAN APs of the transmitted wireless LAN AP information with the wireless LAN AP position database; a signal strength comparison step at which the positioning server compares a signal strength of the transmitted wireless LAN AP information and a signal strength of the wireless LAN AP position database for each of the common wireless LAN APs; and a wireless LAN AP position database update step at which, if, as a result of the comparison between the signal strengths, the signal strength of the transmitted wireless LAN AP information is higher, the positioning server replaces the position value and signal strength of the corresponding wireless LAN AP of the AP position database with the transmitted detection position and signal strength of the wireless LAN AP information.

According to the present invention, preferably, the wireless LAN AP position value positioning method further includes a newly found wireless LAN AP database recording step at which the positioning server checks for a newly found wireless LAN AP, which is a wireless LAN AP that belongs to the received identification information of the wireless LAN APs of wireless LAN AP information of the nearby wireless LAN APs and is not recorded in the wireless LAN AP position database, and records a signal strength of the transmitted wireless LAN AP information and a detection position for the newly found wireless LAN AP in the wireless LAN AP position database.

The present invention further provides a positioning method for continuously updating a position value of a wireless LAN AP to an accurate value based on a wireless LAN AP position value, the positioning method including: a wireless LAN AP information transmission step in which a wireless LAN AP information detection device for a nearby wireless LAN AP detects wireless LAN AP information including identification information of a wireless LAN AP and signal strength information from each of nearby wireless LAN APs, and transmits the detected wireless LAN AP information to a positioning server having a wireless LAN AP position database configured to record a position value of the wireless LAN AP and a signal strength of the wireless LAN AP at the position value in accordance with the identification information of the wireless LAN AP; a common wireless LAN AP checking step at which the positioning server checks for common wireless LAN APs by comparing the identification information of the wireless LAN APs of the transmitted wireless LAN AP information with the wireless LAN AP position database; a signal strength comparison step at which the positioning server compares a signal strength of the transmitted wireless LAN AP information and a signal strength of the wireless LAN AP position database for each of the common wireless LAN APs; a nearby wireless LAN AP wireless LAN AP information detection device position determination step in which the positioning server determines a position value of the wireless LAN AP information detection device for a nearby wireless LAN AP by calculating the position value based on position values of the common wireless LAN APs recorded in the wireless LAN AP position database; and a wireless LAN AP position database update step at which if, as a result of the comparison between signal strengths at the signal strength comparison step, the signal strength of the transmitted wireless LAN AP information is higher, the positioning server replaces the position value and signal strength of the corresponding wireless LAN AP in the wireless LAN AP position database with the position value determined at nearby wireless LAN AP wireless LAN AP information detection device position determination step and the signal strength of the transmitted wireless LAN AP information.

According to the present invention, preferably, the positioning method further includes a newly found wireless LAN AP database recording step at which the positioning server checks for a newly found wireless LAN AP, which is a wireless LAN AP that belongs to the received identification information of the wireless LAN APs of wireless LAN AP information of the nearby wireless LAN APs and is not recorded in the wireless LAN AP position database, and records the signal strength of the transmitted wireless LAN AP information and the position value, determined at the nearby wireless LAN AP wireless LAN AP information detection device position determination step, for the newly found wireless LAN AP in the wireless LAN AP position database.

In this case, when there is no common wireless LAN AP at the common wireless LAN AP checking step, the positioning server preferably determines the position value, transmitted by the wireless LAN AP information detecting device for a nearby wireless LAN APs, to be the position value of the wireless LAN AP information detecting device for a nearby wireless LAN AP. For example, the position value transmitted by the wireless LAN AP information detection device for a nearby wireless LAN AP is preferably a position value that is inquired by the positioning server of the wireless LAN AP information detection device for a nearby wireless LAN AP and then received.

The present invention further provides a positioning server wireless LAN AP position value positioning method for continuously updating a position value of a wireless LAN AP to an accurate value, the positioning server wireless LAN AP position value positioning method including: a wireless LAN AP information and position reception step at which a positioning server having a wireless LAN AP position database configured to record a position value of a wireless LAN AP and a signal strength of the wireless LAN AP at the position value in accordance with identification information of the wireless LAN AP receives detected wireless LAN AP information and detection position information transmitted by a wireless LAN AP information and position detection device for a nearby wireless LAN AP after detecting the wireless LAN AP information, including identification information of a wireless LAN AP and signal strength information, and a detection position, which is a position at which the wireless LAN AP information is detected, from each of nearby wireless LAN APs; a common wireless LAN AP checking step at which the positioning server checks for common wireless LAN APs by comparing the identification information of the wireless LAN APs of the transmitted wireless LAN AP information with the wireless LAN AP position database; a signal strength comparison step at which the positioning server compares a signal strength of the transmitted wireless LAN AP information and a signal strength of the wireless LAN AP position database for each of the common wireless LAN APs; and a wireless LAN AP position database update step at which, if, as a result of the comparison between the signal strengths, the signal strength of the transmitted wireless LAN AP information is higher, the positioning server replaces the position value and signal strength of the corresponding wireless LAN AP of the AP position database with the transmitted detection position and signal strength of the wireless LAN AP information.

The present invention further provides a positioning server positioning method for continuously updating a position value of a wireless LAN AP to an accurate value based on a wireless LAN AP position value, the positioning server positioning method including: a wireless LAN AP information reception step in which a positioning server having a wireless LAN AP position database configured to record a position value of the wireless LAN AP and a signal strength of the wireless LAN AP at the position value in accordance with the identification information of the wireless LAN AP receives wireless LAN AP information transmitted by a wireless LAN AP information detection device for a nearby wireless LAN AP after detecting the wireless LAN AP information including identification information of a wireless LAN AP and signal strength information from each of nearby wireless LAN APs; a common wireless LAN AP checking step at which the positioning server checks for common wireless LAN APs by comparing the identification information of the wireless LAN APs of the transmitted wireless LAN AP information with the wireless LAN AP position database; a signal strength comparison step at which the positioning server compares a signal strength of the transmitted wireless LAN AP information and a signal strength of the wireless LAN AP position database for each of the common wireless LAN APs; a nearby wireless LAN AP wireless LAN AP information detection device position determination step in which the positioning server determines a position value of the wireless LAN AP information detection device for a nearby wireless LAN AP by calculating the position value based on position values of the common wireless LAN APs recorded in the wireless LAN AP position database; and a wireless LAN AP position database update step at which if, as a result of the comparison between signal strengths at the signal strength comparison step, the signal strength of the transmitted wireless LAN AP information is higher, the positioning server replaces the position value and signal strength of the corresponding wireless LAN AP in the wireless LAN AP position database with the position value determined at nearby wireless LAN AP wireless LAN AP information detection device position determination step and the signal strength of the transmitted wireless LAN AP information.

The present invention further provides a wireless LAN AP position value positioning system for continuously updating a position value of a wireless LAN AP to an accurate value, the wireless LAN AP position value positioning system including: a wireless LAN AP information and position detection device for a nearby wireless LAN AP configured to detect wireless LAN AP information, including identification information of a wireless LAN AP and signal strength information, and a detection position, which is a position at which the wireless LAN AP information is detected, from each of nearby wireless LAN APs, and to transmit the detected wireless LAN AP information and detection position information; and a positioning server configured to receive the detected wireless LAN AP information and the detection position information transmitted from the wireless LAN AP information and position detection device for a nearby wireless LAN AP, and to include: a wireless LAN AP position database configured to record a position value of the wireless LAN AP and a signal strength of the wireless LAN AP at the position value in accordance with the identification information of the wireless LAN AP; a common wireless LAN AP checking means configured to check for common wireless LAN APs by comparing the identification information of the wireless LAN APs of the transmitted wireless LAN AP information with the wireless LAN AP position database; a signal strength comparison means configured to compare a signal strength of the transmitted wireless LAN AP information and a signal strength of the wireless LAN AP position database for each of the common wireless LAN APs; and a wireless LAN AP position database update means configured to, if, as a result of the comparison between the signal strengths, the signal strength of the transmitted wireless LAN AP information is higher, replace the position value and signal strength of the corresponding wireless LAN AP of the AP position database with the transmitted detection position and signal strength of the wireless LAN AP information.

The present invention further provides a positioning system for continuously updating a position value of a wireless LAN AP to an accurate value based on a wireless LAN AP position value, the positioning system including: a wireless LAN AP information detection device for a nearby wireless LAN AP configured to detect wireless LAN AP information including identification information of a wireless LAN AP and signal strength information from each of nearby wireless LAN APs, and to transmit the detected wireless LAN AP information; and a positioning server configured to receive the wireless LAN AP information transmitted from the wireless LAN AP information and position detection device for a nearby wireless LAN AP, and to include: a wireless LAN AP position database configured to record a position value of the wireless LAN AP and a signal strength of the wireless LAN AP at the position value in accordance with the identification information of the wireless LAN AP; a common wireless LAN AP checking means configured to check for common wireless LAN APs by comparing the identification information of the wireless LAN APs of the transmitted wireless LAN AP information with the wireless LAN AP position database; a signal strength comparison means configured to compare a signal strength of the transmitted wireless LAN AP information and a signal strength of the wireless LAN AP position database for each of the common wireless LAN APs; a nearby wireless LAN AP wireless LAN AP information detection device position determination means configured to determine a position value of the wireless LAN AP information detection device for a nearby wireless LAN AP by calculating the position value based on position values of the common wireless LAN APs recorded in the wireless LAN AP position database; and a wireless LAN AP position database update means configured to, if, as a result of the comparison between signal strengths by the signal strength comparison means, the signal strength of the transmitted wireless LAN AP information is higher, replace the position value and signal strength of the corresponding wireless LAN AP in the wireless LAN AP position database with the position value determined by the nearby wireless LAN AP wireless LAN AP information detection device position determination means and the signal strength of the transmitted wireless LAN AP information.

Advantageous Effects

According to the present invention, the positioning server stores positions and signal strengths at the positions based on a finite number of wireless LAN APs other than a numerous number of reference positions, and continuously updates the position values of wireless LAN APs in the wireless LAN AP position database to the positions at which wireless LAN APs having high signal strengths are detected, so that, as the position values of the wireless LAN APs are searched for or as positioning is performed, the position values of the wireless LAN APs in the wireless LAN AP position database are increasingly updated to more accurate values.

Accordingly, the positioning server may have a relatively small storage capacity, the processing speed and response speed thereof increase, the high positioning accuracy of wireless LAN APs is achieved, and this accuracy increasingly improves over time.

As the accuracy of the position values of wireless LAN APs recorded by the positioning server is high, the accuracy of positioning based on the position values of these wireless LAN APs also increases.

DESCRIPTION OF DRAWINGS

FIGS. 2 to 4 are diagrams showing a process in which the position values of wireless LAN APs in the wireless LAN AP position database of a positioning server are continuously updated to accurate values as a wireless LAN AP information and position detection device for a nearby wireless LAN AP searches for nearby wireless LAN APs; and FIGS. 5 to 7 are diagrams showing a process in which the position values of wireless LAN APs in the wireless LAN AP position database of a positioning server are continuously updated to accurate values as the wireless LAN AP information detection device for a nearby wireless LAN AP positions itself via the positioning server.

MODE FOR INVENTION

Preferred embodiments of the present invention will now be described in detail below with reference to the accompanying drawings.

Figure 1:
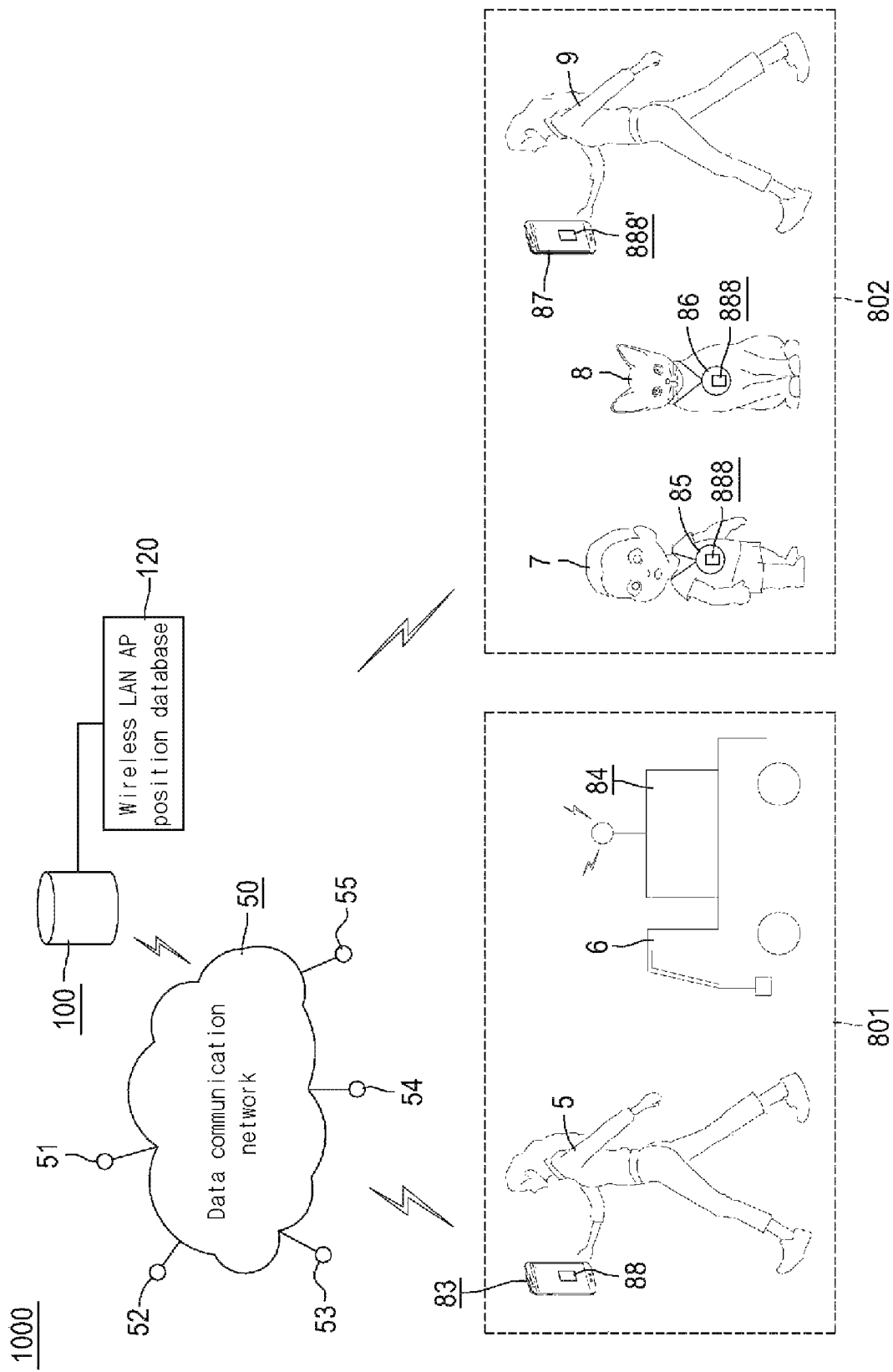
FIG. 1 is a block diagram schematically showing the configuration of a positioning system for continuously updating the position values of wireless LAN APs to accurate values according to the present invention.

FIG. 1 is a block diagram schematically showing the configuration of a positioning system 1000 for continuously updating the position values of wireless LAN APs to accurate values according to the present invention.

As shown in this drawing, a data communication network 50 is provided, and a plurality of wireless LAN access points (APs) 51, 52, 53, 54 and 55 is connected to the data communication network 50.

The data communication network 50 includes the Internet and a mobile communication network and enables data communication through them. The wireless LAN APs 51, 52, 53, 54 and 55 are connected to the Internet of the data communication network 50, and terminals 83, 84, 85, 86 and 87 capable of communicating with these wireless LAN APs 51, 52, 53, 54 and 55 are wirelessly connected and may communicate over the data communication network 50.

According to the present invention, as the terminals, there may be provided terminals 83 and 84 that, while moving after being mounted on a human 5 or vehicle 6, detect the wireless LAN AP information of nearby wireless LAN APs (the identification information of wireless LAN APs such as the MAC addresses of wireless LAN APs, and the signal strengths of the wireless LAN APs), detect detection positions, which are the positions where the nearby wireless LAN AP information is detected (i.e., the positions of the terminals that detect the nearby wireless LAN AP information), and transmit the detected information to a positioning server 100 to be described later, and that belong to a wireless LAN AP position value search group 801.

Furthermore, according to the present invention, as the terminals, there may be provided terminals 85, 86 and 87 that are worn by an infant 7, an adolescent or adult 9, a companion animal 8, and/or the like, detect the wireless LAN AP information of nearby wireless LAN APs (the identification information of wireless LAN APs such as the MAC addresses of wireless LAN APs, and the signal strengths of the wireless LAN APs), and transmit the detected information to a positioning server 100 to be described later, and that belong to a terminal positioning group 802.

The terminals 83 and 84 of the wireless LAN AP position search group 801 search for nearby wireless LAN APs while moving and transmit the information of the related wireless LAN APs to the positioning server 100 so that the position values of the wireless LAN APs of the wireless LAN AP position database 120 of the positioning server 100 are continuously updated to accurate values.

The terminal 83 is, for example, a smart device such as a laptop, a smartphone, a smartwatch and a smartpad, which is mainly mounted on and moved by the human 5, and is equipped with a wireless LAN AP information and position detection device 88 for a nearby wireless LAN AP.

As described above, the wireless LAN AP information and position detection device 88 for a nearby wireless LAN AP installed in the terminal 83 serves to detect the wireless LAN AP information of wireless LAN APs (the identification information of wireless LAN APs such as the MAC addresses of wireless LAN APs, and the signal strengths of the wireless LAN APs) near the terminal 83 and detection positions and to transmit the information to the positioning server. For example, this is installed in the terminal 83 as a program such as an app. In this case, the detection positions will be GPS information or addresses.

The terminal 84 is a dedicated device that is mainly mounted on the vehicle 6 and serves to detect the wireless LAN AP information of wireless LAN APs (the identification information of wireless LAN APs such as the MAC addresses of wireless LAN APs, and the signal strengths of the wireless LAN APs) near the terminal 84 and detection positions and transmit the information to the positioning server 100, as described above. For example, the wireless LAN signal collection device based on a high-speed mobile vehicle shown in Korean Patent No. 10-1583981 discloses such a dedicated device.

In this case, the terminal 84 becomes the wireless LAN AP information and position detection device for a nearby wireless LAN AP according to the present invention.

The terminals 85, 86 and 87 of the terminal positioning group 802 are possessed or worn by the infant 7, the juvenile or adult 9, and the companion animal 8. They are used to allow the positions of the wearers 7, 8 and 9 to be determined by inquiring the positions of the terminals 85, 86 and 87 of the positioning server 100. According to the present invention, through this process, the position values of the wireless LAN APs in the wireless LAN AP position database 120 of the positioning server 100 are continuously updated to correct values.

The terminals 85 and 86 have, for example, a necklace or bracelet form or the like, and are worn by the infant 7 or companion animal 8. The terminals 85 and 86 are each equipped with a wireless LAN AP information detection device 888 for a nearby wireless LAN AP installed in the terminal 83 that detects the wireless LAN AP information of wireless LAN APs (the identification information of wireless LAN APs such as the MAC addresses of wireless LAN APs, and the signal strengths of the wireless LAN APs) near the terminal 85 or 86 and transmits the information to the positioning server.

In this case, the wireless LAN AP information detection device 888 for a nearby wireless LAN AP has both hardware and software configured to achieve the above function.

The terminal 87 is, for example, a smart device mounted on or worn by the adolescent or adult' 9. The terminal 87 is equipped with a wireless LAN AP information detection device 888' for a nearby wireless LAN AP that detects the wireless LAN AP information of nearby wireless LAN APs (the identification information of wireless LAN APs such as the MAC addresses of wireless LAN APs, and the signal strengths of the wireless LAN APs) and transmits the information to the positioning server 100. For example, the wireless LAN AP information detection device 888' for a nearby wireless LAN AP is installed in a smart device as a program such as an app.

According to the present invention, the positioning server 100 is provided. This communicates with the terminals 83, 84, 85, 86 and 87 over the data communication network 50. The positioning server 100 includes a wireless LAN AP position database 120 configured to record the position values of wireless LAN APs and the signal strengths of the wireless LAN APs at the position value in accordance with the identification information of wireless LAN APs such as MAC addresses.

The values of the wireless LAN AP position database 120 may be initially recorded by various methods. One of these methods is that the positioning server 100 receives and records the wireless LAN AP information of nearby wireless LAN APs (the identification information of wireless LAN APs such as the MAC addresses of wireless LAN APs, and the signal strengths of the wireless LAN APs) and detection positions that are searched for, detected and transmitted by the nearby wireless LAN AP information and position detection devices 88 and 84 of the wireless LAN AP position search group 801 while moving.

Figure 2:
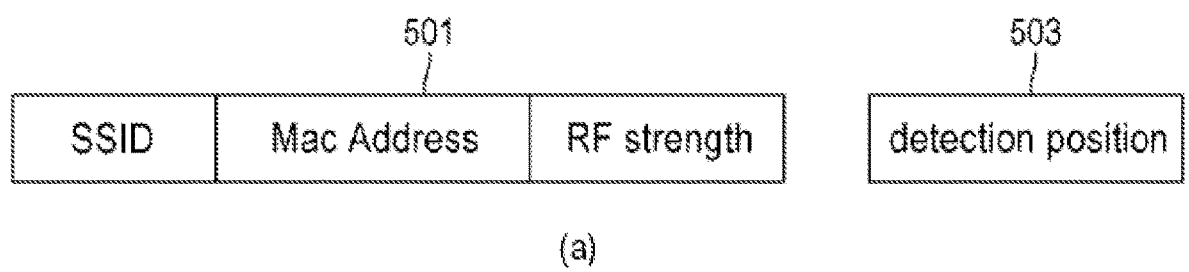
Figure 2:
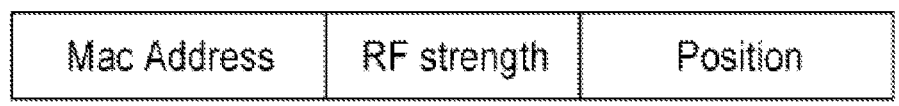
Figure 3:
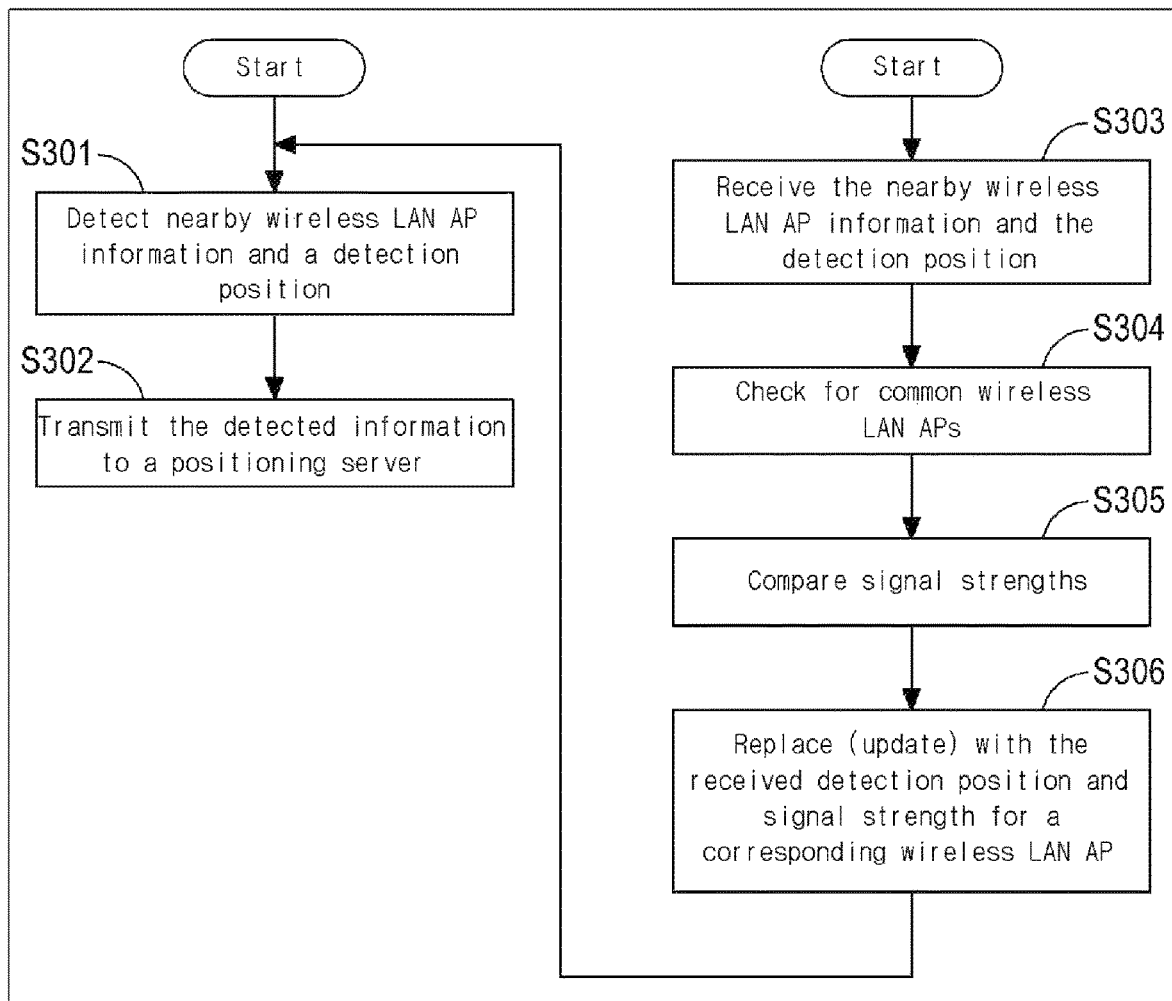

Referring now to FIGS. 2 to 4, there will be described a process in which the position values of the wireless LAN APs of the wireless LAN AP position database 120 of the positioning server 100 are continuously updated to accurate values as the wireless LAN AP information and position detection devices 88 and 84 for a nearby wireless LAN AP of the terminals 83 and 84 of the wireless LAN AP position search group 801 searches for nearby wireless LAN APs while communicating with the positioning server 100.

First, reference numeral 501 of FIG. 2A designates the structure of the fields of wireless LAN AP information transmitted by wireless LAN APs.

This is composed of the SSID, MAC address, and RF strength of each wireless LAN AP that is detected nearby.

For example, the structure may be formed in the form of "DoosanKT!!00-13-78-66-4C-3B-30" and "191, Eulji-ro, Jung-gu, Seoul (or GPS coordinates: 37.566865, 126.999232)." In this case, DoosanKT!! is the SSID, 00-13-78-66-4C-3B is the MAC address, −30 is the strength of the WIFI RF signal, and "191, Eulji-ro, Jung-gu, Seoul (or GPS coordinates: 37.566865, 126.999232)" is the detection position at which the wireless LAN AP information and position detection devices 88 and 84 for an adjacent wireless LAN AP detected the above-described "DoosanKT**!!00-13-78-66-4C-3B-30."

The SSID stands for Service Set Identifier, and refers to a unique identifier added to each of the headers of packets transmitted over a wireless LAN.

The wireless LAN AP information and position detection devices 88 and 84 for a nearby wireless LAN AP according to the present invention collect MAC addresses, which are the identification information of wireless LAN APs, and the strengths of the RF signals thereof from nearby wireless LAN APs while moving, detect a detection position 503, which is the position at which the information is collected, and transmit the information to the positioning server 100.

The detection position 503 may be given as an address value, but may be given as coordinate values such as GPS values.

FIG. 2(b) shows the fields of information that is recorded in the wireless LAN AP position database 120. In these fields, the strength of a signal and the position at which the signal is detected (a detection position) are recorded in accordance with a MAC address, which is the identification information of a wireless LAN AP. The detection position may be an address value or coordinate value such as a GPS value.

FIG. 3 is a flowchart showing a process in which the position values of the wireless LAN APs of the wireless LAN AP position database 120 of the positioning server 100 are continuously updated to accurate values as the wireless LAN AP information and position detection devices 88 and 84 for a nearby wireless LAN AP of the terminals 83 and 84 of the wireless LAN AP position search group 801 search for nearby wireless LAN APs while communicating with the positioning server 100.

First, the wireless LAN AP information and position detection devices 88 and 84 for a nearby wireless LAN AP detect wireless LAN AP information, including the identification information of a wireless LAN AP (a MAC address) and a signal strength, and a detection position, which is the position at which the wireless LAN AP information is detected, from each of nearby wireless LAN APs at step S301.

Thereafter, the wireless LAN AP information and position detection devices 88 and 84 for a nearby wireless LAN AP transmit the detected wireless LAN AP information and detection position information to the positioning server 100 at step S302.

Accordingly, the positioning server 100 receives the transmitted nearby wireless LAN AP information of wireless LAN APs and the detection position information at step S303.

Thereafter, the positioning server 100 checks for common wireless LAN APs by comparing MAC addresses, which are the identification information of the wireless LAN APs of the transmitted wireless LAN AP information, with the wireless LAN AP position database 120 at step S304.

For example, the reference symbol 11 of FIG. 4(a) designates the wireless LAN AP information and detection position that are detected by the wireless LAN AP information and position detection devices 88 and 84 for a nearby wireless LAN AP and transmitted to the positioning server 100, and reference symbol 120 designates the recorded values of the wireless LAN AP position database.

Reference symbol 11 indicates that wireless LAN APs having MAC addresses of a0, a1, a3, and a5 were detected at the detection position $G_d$, and the signal strengths thereof were −75, −87, −95, and −120, respectively.

The recorded values of the wireless LAN AP position database 120 indicated by reference symbol 120 record a signal strength and a position value in accordance with each MAC address.

The positioning server 120 checks whether the transmitted wireless LAN AP information and detection positions information 11 and the wireless LAN AP database 120 have common wireless LAN AP identification information.

In this case, MAC addresses a1, a3 and a5 are common, and become common wireless LAN APs.

Thereafter, the positioning server 100 compares the signal strength of the transmitted wireless LAN AP information and the signal strength of the wireless LAN AP position database 120 for each of the common wireless LAN APs at step S305.

If, as a result of the comparison between the signal strengths in this way, the signal strength of the transmitted wireless LAN AP information is higher, this means that the detection position of the transmitted wireless LAN AP information is closer to the actual position of the corresponding wireless LAN AP. Accordingly, the record of the wireless LAN AP position database 120 is updated by replacing the position value and signal strength of the corresponding wireless LAN AP of the AP position database 120 with the detection position and signal strength of the transmitted wireless LAN AP information at step S306.

For example, in FIG. 4(*b*), the strengths of signals transmitted to the common wireless LAN APs a1, a3, and a5 are compared with the strengths of recorded signals in the wireless LAN AP position database 120, in which case it can be seen that the transmitted values of a1 and a5 are higher than the recorded values.

Accordingly, as shown in FIG. 4(*c*), the positioning server 100 updates the signal strengths and position values of the wireless LAN APs a1 and a5 in the wireless LAN AP position database 120 by replacing them with the transmitted values −87, −120 and $G_d$ (see 401 of FIG. 4(*c*)).

Meanwhile, in this case, the positioning server 100 checks for wireless LAN APs that belong to the identification information (MAC addresses) of the wireless LAN APs of the wireless LAN AP information of the nearby wireless LAN APs of the transmitted wireless LAN AP information and position detection devices 88 and 84 for a nearby wireless LAN AP and are not recorded in the wireless LAN AP position database 120, and records the signal strengths and detection position of the transmitted wireless LAN AP information for the found wireless LAN AP in the wireless LAN AP position database 120.

In other words, when the wireless LAN AP information and position detection devices 84 and 88 for a nearby wireless LAN AP newly find a wireless LAN AP that is not recorded in the wireless LAN AP position database 120, the signal strength and position value of the newly found wireless LAN AP is recorded as the signal strength of the transmitted wireless LAN AP information and the transmitted detection position in the wireless LAN AP position database 120.

For example, in FIG. 4(*a*), the wireless LAN APs found and transmitted by the wireless LAN AP information and position detection devices 88 and 84 for a nearby wireless LAN AP are a0, a1, a3, and a5. Among these, a0 is not recorded in the wireless LAN AP position database 120.

Accordingly, the positioning server 100 records the transmitted strength −75 of a signal and the detected position $G_d$ for the newly found wireless LAN AP a0 in the wireless LAN AP position database 120 (see 403 of FIG. 4(*c*)).

As described above, the present invention is configured to compares a signal strength based on the position value of each wireless LAN AP recorded in the wireless LAN AP position database 120 with a signal strength based on a detection position value obtained by the actual search of the wireless LAN AP information and position detection devices 88 and 84 for a nearby wireless LAN AP, and to, if the signal strength based on the detection position value obtained by the actual search of the wireless LAN AP information and position detection devices 88 and 84 for a nearby wireless LAN AP is higher, which means that the detection position value is located closer to the corresponding wireless LAN AP, update the position value and signal strength of the corresponding wireless LAN AP of the wireless LAN AP position database 120 by replacing them with the actually found values.

Accordingly, as the wireless LAN AP information and position detection devices 88 and 84 for a nearby wireless LAN AP perform searching, the position values of the wireless LAN APs recorded in the wireless LAN AP position database 120 continue to converge into accurate values.

FIGS. 5 and 7 show a process in which the wireless LAN AP information detection devices 888 and 888' for a nearby wireless LAN AP of the terminals 85, 86 and 87 of the terminal positioning group 802 position themselves through the positioning server 100.

According to the present invention, the position values of the wireless LAN APs in the wireless LAN AP position database 120 of the positioning server 100 are continuously updated to correct values through the positioning process of the terminals.

FIG. 5 shows the structure of the fields of the information transmitted by a wireless LAN AP.

The wireless LAN AP information detection devices 888 888' for a nearby wireless LAN AP detect and collect the MAC addresses, which are the identification information of wireless LAN APs, and the RF strengths of RF signals from nearby wireless LAN APs, and transmit the detected information to the positioning server 100.

Figure 6:
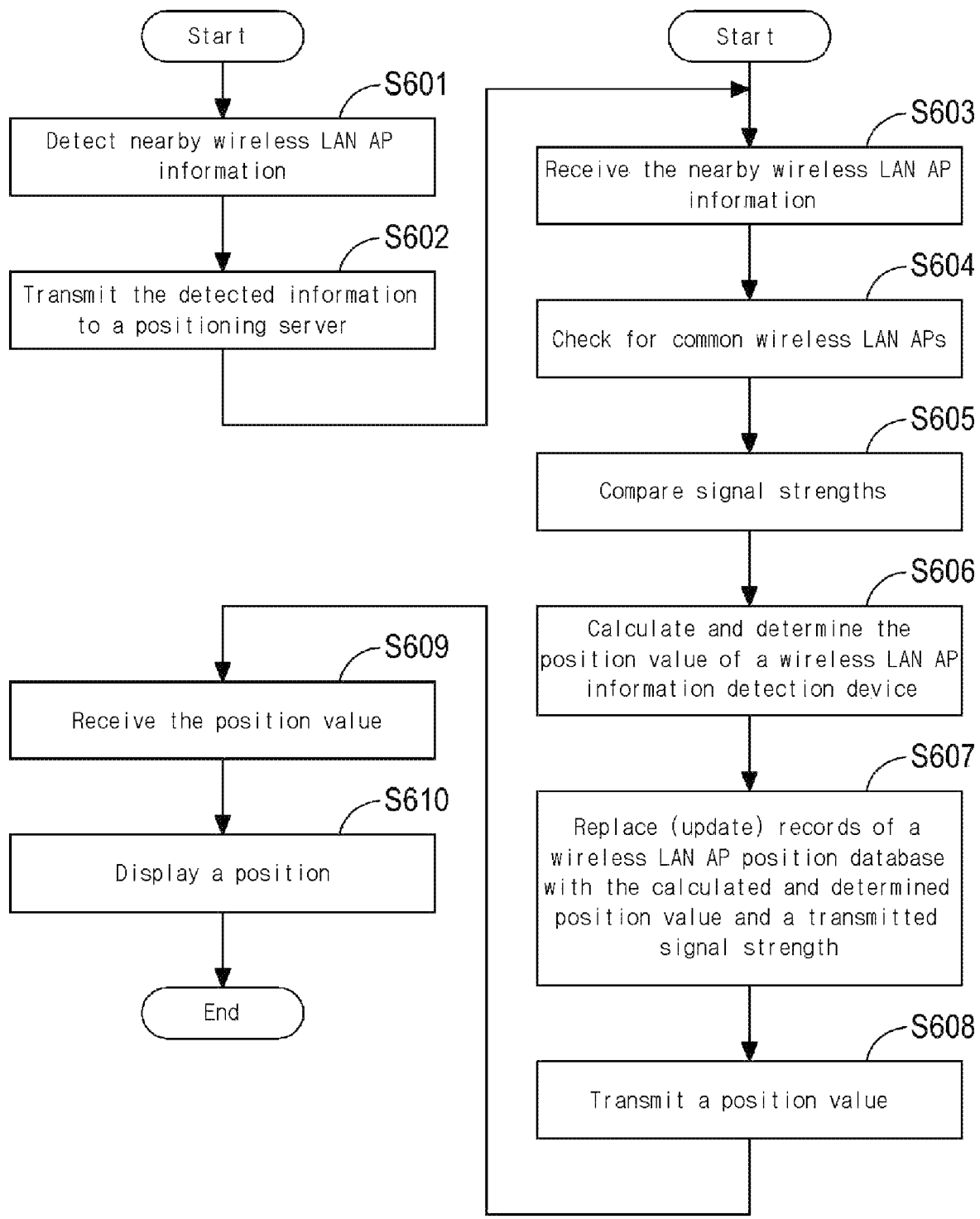

FIG. 6 is a flowchart showing a process in which the wireless LAN AP information detection devices 888 and 888' for a nearby wireless LAN AP of the terminals 85, 86 and 87 of the terminal positioning group 802 position themselves through the positioning server 100.

First, the wireless LAN AP information detection devices 888 and 888' for a nearby wireless LAN AP detect wireless LAN AP information including MAC addresses, which is the identification information of wireless LAN APs, and signal strength information from nearby wireless LAN APs at step S601.

Thereafter, the nearby wireless LAN AP information detection devices 888 and 888' for a wireless LAN AP transmit the detected wireless LAN AP information to the positioning server 100 at step S602.

Accordingly, the positioning server 100 receives the wireless LAN AP information of the nearby wireless LAN APs at step S603

Thereafter, the positioning server 100 checks for common wireless LAN APs by comparing the MAC addresses, which are the identification information of the wireless LAN APs of the transmitted wireless LAN AP information, with the wireless LAN AP position database 120 at step S604

For example, reference symbol 11' of FIG. 7(*a*) designates the wireless LAN AP information that is detected by the wireless LAN AP information and position detection devices 88 and 84 for a nearby wireless LAN AP and transmitted to the positioning server 100, and reference symbol 120 designates the recorded values of the wireless LAN AP position database.

Reference symbol 11' indicates that wireless LAN APs having MAC addresses of a0, a1, a3, and a4 were detected, and the signal strengths thereof were −78, −85, −97, −110, and −130, respectively.

The recorded values of the wireless LAN AP position database 120 designated by reference symbol 120 record a signal strength and a position value in accordance with each MAC address.

The positioning server 100 checks whether the transmitted wireless LAN AP information and detection positions information 11 and the wireless LAN AP database 120 have common wireless LAN AP identification information.

In this case, MAC addresses a1, a3, and a4 are common, and become common wireless LAN APs.

Thereafter, the positioning server 100 compares the signal strength of the transmitted wireless LAN AP information and the signal strength of the wireless LAN AP position database 120 for each of the common wireless LAN APs at step S605.

For example, in FIG. 7(b), for the common wireless LAN APs, the transmitted signal strengths are compared with the signal strengths recorded in the database 120.

As shown in the drawing, in the case of a2 and a4, the transmitted signals are higher.

Furthermore, the positioning server 100 the determines the position values of the wireless LAN AP information detection devices 888 and 888' for a nearby wireless LAN AP by calculating the position values based on the position values of the common wireless LAN APs recorded in the wireless LAN AP position database 120 at step S606.

As shown in FIG. 7(c), the position value of Gm is obtained by determining the positions of the wireless LAN AP information detection devices 888 and 888' by calculating the positions by triangulating the common wireless LAN APs a2, a3, and a4 based on the position values G2, G3, and G4 of the database 120.

In this case, when the calculation is performed through triangulation, it is preferable to perform the calculation based on the weights assigned according to the transmitted signal strengths of the common wireless LAN a2, a3, and a4.

As an example, when there are two common wireless LAN APs, the average position of these position values is calculated and the position values of the wireless LAN AP information detection devices 888 and 888' for a nearby wireless LAN AP are determined. When there is one common wireless LAN AP, the position thereof is determined to be the position values of the wireless LAN AP information detection devices 888 and 888' for a nearby wireless LAN AP.

When it is determined by comparing signal strengths at step S605 that the signal strength of the transmitted wireless LAN AP information is higher, this means that the calculated and determined position of the wireless LAN AP information is closer to an actual position compared to the position of the corresponding wireless LAN AP recorded in the database 120.

Accordingly, records of the wireless LAN AP position database 120 are updated by replacing the position value and signal strength of the corresponding wireless LAN AP in the wireless LAN AP position database 120 with the calculated and determined position value of the wireless LAN AP information detection device and the transmitted signal strength at step S607.

However, in the case where the strength of the signal recorded in the wireless LAN AP position database 120 is sufficiently high, even when the signal strength of the transmitted wireless LAN AP is high, the strength of the signal is not replaced, but only the position value is replaced.

For example, when the signal strength recorded in the wireless LAN AP position database 120 is −60 or higher, the recorded value of the signal strength is maintained in connection with the corresponding wireless LAN AP, and only the position value is updated by replacing the position value with the calculated and determined position value of the wireless LAN AP information detection device.

In FIG. 7(d), since, when the signal strengths transmitted to the common wireless LAN APs a2, a3, and a4 are compared with the signal strengths recorded in the database 120, the signal strengths of the wireless LAN APs a2 and a4 are higher, the signal strengths of a2 and a4 are replaced with the transmitted signals, and also the position values are replaced with Gm, which is a value determined by calculating in step S606, as shown in FIG. 7(b) (see 701 of FIG. 7(d)).

Meanwhile, in this case, the positioning server 100 checks for a wireless LAN AP not recorded in the wireless LAN AP position database 120 in the identification information of the wireless LAN APs of the wireless LAN AP information transmitted for the nearby wireless LAN APs near the wireless LAN AP information detection devices 888 and 888' for a nearby wireless LAN AP, and records the signal strength of the wireless LAN AP information transmitted to the wireless LAN AP position database 120 and the position value determined at step S606 for the found wireless LAN AP.

In other words, when the wireless LAN AP information and position detection devices 888 and 888' for a nearby wireless LAN AP newly find one or more wireless LAN APs that are not recorded in the wireless LAN AP position database 120, the signal strengths and position values of the newly found wireless LAN APs are recorded as the signal strengths of the transmitted wireless LAN AP information and the position value determined at step S606 in the wireless LAN AP position database 120.

For example, in FIG. 7(a), the wireless LAN APs found and transmitted by the wireless LAN AP information and position detection devices 888 and 888' for a nearby wireless LAN AP are a0, a1, a2, a3, and a4. Among these, a0 and a1 are not recorded in the wireless LAN AP position database 120.

Accordingly, the positioning server 100 records the transmitted signal strengths −78 and −85 and the position value Gm calculated based on step S606 for the newly found wireless LAN APs a0 and a1 in the wireless LAN AP position database 120 (see 703 of FIG. 7(d)).

Thereafter, the positioning server 100 transmits the calculated and determined value Gm to the wireless LAN AP information detection devices 888 and 888' at step S608, and the wireless LAN AP information detection devices 888 and 888' having received the value at step S609 display the position at step S610.

FIG. 7(e) shows a situation in which the wireless LAN AP information detection devices 888 and 888' inquires their positions of the positioning server 100 and display the received value.

Meanwhile, according to step S604 of the present invention, when there is no common wireless LAN AP at the common wireless LAN AP checking step, the positioning server 100 may determine the position value transmitted by the wireless LAN AP information detecting devices 888 and 888' for a nearby wireless LAN APs to be the position value of the wireless LAN AP information detecting devices 888 and 888' for a nearby wireless LAN AP.

For example, the position value of the wireless LAN AP information detecting devices 888 and 888' for a nearby wireless LAN AP based on a network may be checked for and then transmitted. This value is determined to be the position value of the wireless LAN AP information detecting devices 888 and 888' for a nearby wireless LAN AP, and is reported to the wireless LAN AP information detecting devices 888 and 888' for a nearby wireless LAN AP.

In this case, it is preferable that after determining that there is no common wireless LAN AP, the positioning server 100 inquire a position value of the wireless LAN AP information detection devices 888 and 888' for a nearby wireless LAN AP, receive the position value, determine the value to be the position value of the wireless LAN AP information detection devices 888 and 888' for a nearby wireless LAN AP, and report this to the wireless LAN AP information detection devices 888 and 888' for a nearby wireless LAN AP.

In another case, when the wireless LAN AP information detection devices 888 and 888' for a nearby wireless LAN AP initially transmits wireless LAN AP information, it may transmit a position value based on the network thereof. The positioning server 100 may determine this value to be the position value of the wireless LAN AP information detection devices 888 and 888' for a nearby wireless LAN AP and may report it to the wireless LAN AP information detection devices 888 and 888' for a nearby wireless LAN AP.

As described above, the present invention is configured to compare a signal strength based on the position value of a wireless LAN AP recorded in the wireless LAN AP position database 120 with the signal strength of the corresponding wireless LAN AP actually searched for and found by the wireless LAN AP information detection devices 888 and 888' for a nearby wireless LAN AP. When the signal strength of the corresponding wireless LAN AP actually searched for and found by the wireless LAN AP information detection devices 888 and 888' for a nearby wireless LAN AP is higher, this means that the position of the wireless LAN AP information detection devices 888 and 888' for a nearby wireless LAN AP is located closer to the corresponding wireless LAN AP. The positions of the wireless LAN AP information detection devices 888 and 888' for a nearby wireless LAN AP are calculated based on the position values of common wireless LAN APs. The position value of the corresponding wireless LAN AP and the signal strength in the wireless LAN AP position database 120 are updated by replacing the position value and the signal strength with the calculated position value and the actually found signal strength. The position value of the wireless LAN AP information detection devices 888 and 888' for a nearby wireless LAN AP obtained in the above process is returned and displayed.

Therefore, as the wireless LAN AP information detection devices 888 and 888' for a nearby wireless LAN AP continuously position themselves, the position values of the wireless LAN APs recorded in the wireless LAN AP position database 120 continue to converge into correct values.

The invention claimed is:

1. A wireless LAN AP position value positioning method for continuously updating a position value of a wireless LAN AP to an accurate value, the wireless LAN AP position value positioning method comprising:
(a) a wireless LAN AP information and position transmission step at which a wireless LAN AP information and position detection device for a nearby wireless LAN AP detects wireless LAN AP information, including identification information of a wireless LAN AP and signal strength information, and a detection position, which is a position at which the wireless LAN AP information is detected, from each of nearby wireless LAN APs, and transmits the detected wireless LAN AP information and detection position information to a positioning server having a wireless LAN AP position database configured to record a position value of the wireless LAN AP and a signal strength of the wireless LAN AP at the position value in accordance with the identification information of the wireless LAN AP;
(b) a common wireless LAN AP checking step at which the positioning server checks for common wireless LAN APs by comparing the identification information of the wireless LAN APs of the transmitted wireless LAN AP information with the wireless LAN AP position database, the common wireless LAN APs being the transmitted wireless LAN APs having a common media access control (MAC) address with APs in the wireless LAN AP position database, respectively, and being used to determine whether the wireless LAN AP position database is updated;
(c) a signal strength comparison step at which the positioning server compares a signal strength of the transmitted wireless LAN AP information and a signal strength of the wireless LAN AP position database for each of the common wireless LAN APs; and
(d) a wireless LAN AP position database update step at which, if, as a result of the comparison between the signal strengths, the signal strength of the transmitted wireless LAN AP information is higher, the positioning server replaces the position value and signal strength of the corresponding wireless LAN AP of the wireless LAN AP position database with the transmitted detection position and signal strength of the wireless LAN AP information.

2. The wireless LAN AP position value positioning method of claim 1, further comprising a newly found wireless LAN AP database recording step at which the positioning server checks for a newly found wireless LAN AP, which is a wireless LAN AP that belongs to the received identification information of the wireless LAN APs of wireless LAN AP information of the nearby wireless LAN APs and is not recorded in the wireless LAN AP position database, and records a signal strength of the transmitted wireless LAN AP information and a detection position for the newly found wireless LAN AP in the wireless LAN AP position database.

3. A positioning method for continuously updating a position value of a wireless LAN AP to an accurate value based on a wireless LAN AP position value, the positioning method comprising:
(a) a wireless LAN AP information transmission step in which a wireless LAN AP information detection device for a nearby wireless LAN AP detects wireless LAN AP information including identification information of a wireless LAN AP and signal strength information from each of nearby wireless LAN APs, and transmits the detected wireless LAN AP information to a positioning server having a wireless LAN AP position database configured to record a position value of the wireless LAN AP and a signal strength of the wireless LAN AP at the position value in accordance with the identification information of the wireless LAN AP;
(b) a common wireless LAN AP checking step at which the positioning server checks for common wireless LAN APs by comparing the identification information of the wireless LAN APs of the transmitted wireless LAN AP information with the wireless LAN AP position database, the common wireless LAN APs being the transmitted wireless LAN APs having a common media access control (MAC) address with APs in the wireless LAN AP position database, respectively, and being used to determine whether the wireless LAN AP position database is updated;
(c) a signal strength comparison step at which the positioning server compares a signal strength of the transmitted wireless LAN AP information and a signal strength of the wireless LAN AP position database for each of the common wireless LAN APs;

(d) a nearby wireless LAN AP wireless LAN AP information detection device position determination step in which the positioning server determines a position value of the wireless LAN AP information detection device for a nearby wireless LAN AP by calculating the position value based on position values of the common wireless LAN APs recorded in the wireless LAN AP position database; and (e) a wireless LAN AP position database update step at which if, as a result of the comparison between signal strengths at the signal strength comparison step, the signal strength of the transmitted wireless LAN AP information is higher, the positioning server replaces the position value and signal strength of the corresponding wireless LAN AP in the wireless LAN AP position database with the position value determined at nearby wireless LAN AP wireless LAN AP information detection device position determination step and the signal strength of the transmitted wireless LAN AP information.

4. The positioning method of claim 3, further comprising a newly found wireless LAN AP database recording step at which the positioning server checks for a newly found wireless LAN AP, which is a wireless LAN AP that belongs to the received identification information of the wireless LAN APs of wireless LAN AP information of the nearby wireless LAN APs and is not recorded in the wireless LAN AP position database, and records a signal strength of the transmitted wireless LAN AP information and the position value, determined at the nearby wireless LAN AP wireless LAN AP information detection device position determination step, for the newly found wireless LAN AP in the wireless LAN AP position database.

5. The positioning method of claim 4, wherein when there is no common wireless LAN AP at the common wireless LAN AP checking step, the positioning server determines the position value, transmitted by the wireless LAN AP information detecting device for a nearby wireless LAN APs, to be the position value of the wireless LAN AP information detecting device for a nearby wireless LAN AP.

6. The positioning method of claim 5, wherein the position value transmitted by the wireless LAN AP information detection device for a nearby wireless LAN AP is a position value that is inquired by the positioning server of the wireless LAN AP information detection device for a nearby wireless LAN AP and then received.

7. The positioning method of claim 3, wherein when there is no common wireless LAN AP at the common wireless LAN AP checking step, the positioning server determines the position value, transmitted by the wireless LAN AP information detecting device for a nearby wireless LAN APs, to be the position value of the wireless LAN AP information detecting device for a nearby wireless LAN AP.

8. The positioning method of claim 7, wherein the position value transmitted by the wireless LAN AP information detection device for a nearby wireless LAN AP is a position value that is inquired by the positioning server of the wireless LAN AP information detection device for a nearby wireless LAN AP and then received.

9. A positioning server wireless LAN AP position value positioning method for continuously updating a position value of a wireless LAN AP to an accurate value, the positioning server wireless LAN AP position value positioning method comprising:

(a) a wireless LAN AP information and position reception step at which a positioning server having a wireless LAN AP position database configured to record a position value of a wireless LAN AP and a signal strength of the wireless LAN AP at the position value in accordance with identification information of the wireless LAN AP receives detected wireless LAN AP information and detection position information transmitted by a wireless LAN AP information and position detection device for a nearby wireless LAN AP after detecting the wireless LAN AP information, including identification information of a wireless LAN AP and signal strength information, and a detection position, which is a position at which the wireless LAN AP information is detected, from each of nearby wireless LAN APs;

(b) a common wireless LAN AP checking step at which the positioning server checks for common wireless LAN APs by comparing the identification information of the wireless LAN APs of the transmitted wireless LAN AP information with the wireless LAN AP position database, the common wireless LAN APs being the transmitted wireless LAN APs having a common media access control (MAC) address with APs in the wireless LAN AP position database, respectively, and being used to determine whether the wireless LAN AP position database is updated;

(c) a signal strength comparison step at which the positioning server compares a signal strength of the transmitted wireless LAN AP information and a signal strength of the wireless LAN AP position database for each of the common wireless LAN APs; and (d) a wireless LAN AP position database update step at which, if, as a result of the comparison between the signal strengths, the signal strength of the transmitted wireless LAN AP information is higher, the positioning server replaces the position value and signal strength of the corresponding wireless LAN AP of the AP position database with the transmitted detection position and signal strength of the wireless LAN AP information.

10. A positioning server positioning method for continuously updating a position value of a wireless LAN AP to an accurate value based on a wireless LAN AP position value, the positioning server positioning method comprising:

(a) a wireless LAN AP information reception step in which a positioning server having a wireless LAN AP position database configured to record a position value of the wireless LAN AP and a signal strength of the wireless LAN AP at the position value in accordance with the identification information of the wireless LAN AP receives wireless LAN AP information transmitted by a wireless LAN AP information detection device for a nearby wireless LAN AP after detecting the wireless LAN AP information including identification information of a wireless LAN AP and signal strength information from each of nearby wireless LAN APs;

(b) a common wireless LAN AP checking step at which the positioning server checks for common wireless LAN APs by comparing the identification information of the wireless LAN APs of the transmitted wireless LAN AP information with the wireless LAN AP position database, the common wireless LAN APs being the transmitted wireless LAN APs having a common media access control (MAC) address with APs in the wireless LAN AP position database, respectively, and being used to determine whether the wireless LAN AP position database is updated;

(c) a signal strength comparison step at which the positioning server compares a signal strength of the transmitted wireless LAN AP information and a signal strength of the wireless LAN AP position database for each of the common wireless LAN APs;

(d) a nearby wireless LAN AP wireless LAN AP information detection device position determination step in which the positioning server determines a position value of the wireless LAN AP information detection device for a nearby wireless LAN AP by calculating the position value based on position values of the common wireless LAN APs recorded in the wireless LAN AP position database; and (e) a wireless LAN AP position database update step at which if, as a result of the comparison between signal strengths at the signal strength comparison step, the signal strength of the transmitted wireless LAN AP information is higher, the positioning server replaces the position value and signal strength of the corresponding wireless LAN AP in the wireless LAN AP position database with the position value determined at nearby wireless LAN AP wireless LAN AP information detection device position determination step and the signal strength of the transmitted wireless LAN AP information.

11. A wireless LAN AP position value positioning system for continuously updating a position value of a wireless LAN AP to an accurate value, the wireless LAN AP position value positioning system comprising:

(a) a wireless LAN AP information and position detection device for a nearby wireless LAN AP configured to detect wireless LAN AP information, including identification information of a wireless LAN AP and signal strength information, and a detection position, which is a position at which the wireless LAN AP information is detected, from each of nearby wireless LAN APs, and to transmit the detected wireless LAN AP information and detection position information; and (b) a positioning server configured to receive the detected wireless LAN AP information and the detection position information transmitted from the wireless LAN AP information and position detection device for a nearby wireless LAN AP, and to include:

(b1) a wireless LAN AP position database configured to record a position value of the wireless LAN AP and a signal strength of the wireless LAN AP at the position value in accordance with the identification information of the wireless LAN AP;

(b2) a common wireless LAN AP checking means configured to check for common wireless LAN APs by comparing the identification information of the wireless LAN APs of the transmitted wireless LAN AP information with the wireless LAN AP position database, the common wireless LAN APs being the transmitted wireless LAN APs having a common media access control (MAC) address with APs in the wireless LAN AP position database, respectively, and being used to determine whether the wireless LAN AP position database is updated;

(b3) a signal strength comparison means configured to compare a signal strength of the transmitted wireless LAN AP information and a signal strength of the wireless LAN AP position database for each of the common wireless LAN APs; and (b4) a wireless LAN AP position database update means configured to, if, as a result of the comparison between the signal strengths, the signal strength of the transmitted wireless LAN AP information is higher, replace the position value and signal strength of the corresponding wireless LAN AP of the AP position database with the transmitted detection position and signal strength of the wireless LAN AP information.

12. A positioning system for continuously updating a position value of a wireless LAN AP to an accurate value based on a wireless LAN AP position value, the positioning system comprising:

(a) a wireless LAN AP information detection device for a nearby wireless LAN AP configured to detect wireless LAN AP information including identification information of a wireless LAN AP and signal strength information from each of nearby wireless LAN APs, and to transmit the detected wireless LAN AP information; and (b) a positioning server configured to receive the wireless LAN AP information transmitted from the wireless LAN AP information and position detection device for a nearby wireless LAN AP, and to include:

(b1) a wireless LAN AP position database configured to record a position value of the wireless LAN AP and a signal strength of the wireless LAN AP at the position value in accordance with the identification information of the wireless LAN AP;

(b2) a common wireless LAN AP checking means configured to check for common wireless LAN APs by comparing the identification information of the wireless LAN APs of the transmitted wireless LAN AP information with the wireless LAN AP position database, the common wireless LAN APs being the transmitted wireless LAN APs having a common media access control (MAC) address with APs in the wireless LAN AP position database, respectively, and being used to determine whether the wireless LAN AP position database is updated;

(b3) a signal strength comparison means configured to compare a signal strength of the transmitted wireless LAN AP information and a signal strength of the wireless LAN AP position database for each of the common wireless LAN APs;

(b4) a nearby wireless LAN AP wireless LAN AP information detection device position determination means configured to determine a position value of the wireless LAN AP information detection device for a nearby wireless LAN AP by calculating the position value based on position values of the common wireless LAN APs recorded in the wireless LAN AP position database; and (b5) a wireless LAN AP position database update means configured to, if, as a result of the comparison between signal strengths by the signal strength comparison means, the signal strength of the transmitted wireless LAN AP information is higher, replace the position value and signal strength of the corresponding wireless LAN AP in the wireless LAN AP position database with the position value determined by the nearby wireless LAN AP wireless LAN AP information detection device position determination means and the signal strength of the transmitted wireless LAN AP information.

* * * * *